United States Patent [19]

Dehm

[11] 4,384,089
[45] May 17, 1983

[54] LOW TEMPERATURE POLYMERIZATION PROCESS

[75] Inventor: David C. Dehm, Thornton, Pa.

[73] Assignee: Atlantic Richfield Company, Los Angeles, Calif.

[21] Appl. No.: 311,567

[22] Filed: Oct. 15, 1981

[51] Int. Cl.$^3$ ............................................... C08F 4/64
[52] U.S. Cl. ..................................... 526/159; 137/13; 252/8.3; 252/8.55 B; 526/84; 526/348.3; 526/916
[58] Field of Search ........................ 526/348.3, 159, 84

[56] References Cited

U.S. PATENT DOCUMENTS

| | | | |
|---|---|---|---|
| 3,351,079 | 11/1967 | Gibson | 137/13 |
| 3,493,000 | 2/1970 | Canevari et al. | 137/13 |
| 3,559,664 | 2/1971 | Seymour et al. | 137/13 |
| 3,682,187 | 8/1972 | Seymour et al. | 137/13 |
| 3,692,676 | 9/1972 | Culter et al. | 252/8.55 R |

Primary Examiner—Stanford M. Levin

[57] ABSTRACT

The hydrocarbon fluid friction reducing properties of copolymers of two or more alpha-monoolefins having 4 to 20 carbon atoms is improved by copolymerizing the monomers in the liquid state by means of a Ziegler catalyst at a temperature of about 0° C. or lower.

7 Claims, No Drawings

LOW TEMPERATURE POLYMERIZATION PROCESS

BACKGROUND OF THE INVENTION

1. Field of the Invention

This invention relates to the preparation of alpha-olefin copolymers and more particularly to the preparation of alpha-olefin copolymers having improved hydrocarbon oil pipeline friction-reducing properties.

2. Prior Art

When fluids are pumped through a conduit, such as a pipeline, friction resulting from the movement of the fluid over the inside surface of the conduit causes a pressure drop in the fluid which increases as the downstream distance from the pump increases. The pressure drop results in reduced flow rates. It is known that the flow rate of the fluid through the conduit can be increased by reducing the friction of the fluid in the conduit.

Hydrocarbon fluid frictional loss in conduits can be reduced by injecting into the fluid polymeric substances which are capable of reducing the friction loss of the fluid moving through the conduit. It has been reported that alpha monoolefin polymers are particularly useful for reducing friction loss in hydrocarbons such as crude oil flowing through pipelines. U.S. Pat. No. 3,692,676 discloses the reduction of friction loss in hydrocarbon liquids flowing through pipelines by adding to such liquids small amounts of homopolymers or copolymers of alpha-olefins having from 6 to 20 carbon atoms. U.S. Pat. Nos. 3,351,079; 3,493,000; 3,559,664 and 3,682,187, disclose the addition of polyethylene or copolymers of ethylene and propylene or other low molecular weight alpha-monoolefins to hydrocarbon fluids to reduce fluid friction loss. U.S. patent application Ser. No. 230,775 filed Feb. 2, 1981 discloses the addition of copolymers of butene-1 and at least one other alpha-monoolefin to a hydrocarbon fluid flowing in a pipeline to reduce frictional loss. The specifications of the above patents and patent application are incorporated herein by reference.

Even though such additives may effect drag reduction in hydrocarbon liquids flowing through conduits their use is expensive because of their high costs and the large quantities of them required in continuous use applications. Accordingly, improvements which lower the cost of use of these drag reducing agents, such as increasing their efficiency, are continuously sought.

SUMMARY OF THE INVENTION

A method of improving the efficiency of alpha-monoolefin copolymer based hydrocarbon oil pipeline friction reducing agents has now been discovered. Accordingly, it is an object of the invention to present an improved method of producing alpha-monoolefin copolymer hydrocarbon conduit friction reducing agents. It is another object of the invention to present a method of producing alpha-monoolefin copolymers having improved hydrocarbon conduit friction reducing properties. It is another object of the invention to present alpha-monoolefin copolymers having improved hydrocarbon conduit friction reducing properties. These and other objects of the invention are supported in the following description and examples.

In accordance with the teachings of the invention the friction reducing properties of alpha-monoolefin copolymers prepared in an inert solvent by the Ziegler polymerization process is improved significantly by maintaining the temperature of the polymerization mixture at about 0° C. or lower until about 15 weight percent or more of the monomeric material charged into the reactor has been converted to polymer. The copolymers are prepared from two or more alpha-monoolefins having 3 to 20 carbon atoms. In preferred embodiments of the invention the temperature of the polymerizing mixture is maintained below about -5° C. until about 15 to 50 weight percent of the monomeric material charged to the reactor is converted to polymer; additional solvent is added to the reaction mixture during polymerization and the preferred alpha-monoolefin monomer reactants are those having 4 to 16 carbon atoms.

DETAILED DESCRIPTION OF THE INVENTION

The improved copolymers of the invention are prepared from alpha-monoolefins having 3 to about 20 carbon atoms. Alpha-monolefins having more than about 20 carbon atoms can be used in the preparation of hydrocarbon pipeline friction-reducing agents but they are not usually employed due to their lower reactivities. Generally, highly favorable results have been observed when the friction reducing polymers are prepared from alpha-monoolefins having 4 to about 16 carbon atoms. These monomers are preferred for use in the process of the invention since they are most easily polymerized to high molecular weight polymers under liquid state polymerization conditions. The most preferred monomers are those having 4 to 14 carbon atoms. The polymeric compositions of the invention may be prepared from two or from more than two alpha-monoolefins. When two alpha-monoolefin component systems are employed each alpha-monoolefin component is usually present in the reaction mixture in an amount sufficient to produce a copolymer containing at least 10 mole percent of each component. In the preferred embodiments of the two alpha-monoolefin component system each component is present in an amount sufficient to produce copolymers containing 25 or more mole percent of each component. In three or more alpha-monoolefin component systems it is preferred that the maximum content of any one monomer is 90 mole percent and most preferably 75 mole percent, based on the total number of moles of alpha-monoolefin monomers present in the reaction mixture.

Examples of two monomer component systems are propene-dodecene-1, butene-1-dodecene-1, butene-1-decene-1, hexene-1-dodecene-1, and octene-1-tetradecene-1, etc. Examples of three component systems include butene-1-decene-1-dodecene-1, propene-hexene-1-dodecene-1, etc. Preferred specific monomeric systems are propene-dedecene-1, butene-1-dodecene-1, butene-1-decene-1, and hexene-1-dodecene-1.

The process of the invention can be practiced employing batch or continuous techniques using suitably equipped reaction vessels for the polymerization. Stainless steel and glass-lined reactors are preferable to ordinary steel vessels, since they permit easier control of product quality. Suitable reaction vessels are those equipped with agitator or other mixing means capable of maintaining the reaction mixture uniformly distributed, and cooling means sufficient to maintain the reacting polymerization mixture at a temperature of 0° C. or less in the reaction zone.

The polymerization reaction may be carried out in the presence of an inert solvent or diluent for the polymeric product. The early stage of the polymerization may be carried out by mass polymerization, i.e. the monomer charge can serve as the polymerization medium. However, as the polymerization proceeds the viscosity of the reaction mixture increases because of the formation of polymer and it often becomes increasingly more difficult to provide adequate mixing to dissipate the heat built up during the reaction, which is exothermic. It may then become necessary to form a solution or slurry of the reaction mixture by adding an inert solvent or diluent to the reaction mixture to facilitate temperature and product uniformity control. Suitable solvents and diluents include kerosene, naphtha and other petroleum distillates, such as heptane, octane, etc.

In the preferred embodiment of the invention the polymerization is carried out by the Ziegler process using catalyst systems comprising combinations of a compound of a metal of Groups IV-B, V-B, VI-B, or VIII of the Periodic Chart of the Elements found on pages 392–393 of the Handbook of Chemistry and Physics, 37th Edition with an organometal compound of a rare earth or metal from Groups I-A, II-A, III-A of the Periodic Chart of the Elements. Particularly suitable catalyst systems are those comprising titanium halides and organoaluminum compounds.

Other additives such as chain transfer agents can be added to the reaction mixture as desired.

A typical polymerization according to the preferred embodiment is as follows. A suitably equipped reaction vessel is flushed with nitrogen sufficiently long to purge the reactor of oxygen, and the monomers and solvent (if solvent is initially charged) are charged to the reactor. The reactor is then additionally purged with nitrogen and sealed. The temperature of the reactor contents is reduced to about 0° C. or lower, typically to about 0° to −15° C. and the catalyst is charged. The reaction proceeds at autogeneous pressure. During the reaction the temperature is maintained at or below 0° C. and preferably between about −5° and −15° C. As the viscosity builds up an inert solvent such as kerosene or an inert diluent may, if desired, be added to the reaction vessel in a quantity sufficient to maintain the reactor contents in an easily stirable condition. The polymerization is permitted to continue until the desired conversion of monomer to polymer is achieved. The reaction is terminated by adding an agent to kill the catalyst. Suitable terminating agents include alcohols, such as methyl or isopropyl alcohol. The polymeric product can be recovered from the reaction mixture by water washing or it can be used directly as a slurry or solution. Additional details of the product and its method of use can be obtained from U.S. patent application Ser. No. 230,775, mentioned above.

The invention is further illustrated in the following examples, in which parts and percentages are on a weight basis, unless otherwise indicated.

EXAMPLE I

In a series of polymerizations butene-1-dodecene-1 copolymer is prepared at temperatures of 10° C., 0° C. and −15° C. The polymerization procedure is as follows:

Into a two liter stainless steel reactor which was purged with nitrogen and equipped with a thermocouple, an agitator and a cooling jacket is charged 225 gms of kerosene, 0.76 mole of dodecene-1, 13.7 mls of 25 weight percent solution of diethyl aluminum choloride in heptane and 1.5 gms of aluminum-activated titanium trichloride. Under a nitrogen blanket 0.40 mole of purified butene-1 is charged to the reactor. The reactor is sealed and the reactor pressure is adjusted to 20±5 psig with nitrogen and the reactor temperature is reduced to the desired reaction temperature. The reaction begins upon addition of the reactants and catalyst. During the course of the reaction the reaction mixture is maintained at the desired temperature, the pressure is autogenous and the reactor contents are agitated sufficiently to ensure a uniform temperature throughout the reaction mixture. The reaction is carried out until the desired conversion is achieved. The reaction is then terminated by the addition of sufficient alcoholic sodium hydroxide to completely inactivate the catalyst. Reaction data and product conversions are tabulated in the TABLE.

EXAMPLE II

The procedure of Example I is repeated except that dodecene-1 is substituted for the butene-1-dodecene reaction mixture. The reaction data and product conversions are tabulated in the TABLE.

EXAMPLE III

The procedure of Example II is repeated except that the monomer charge comprises hexene-1 and dodecene-1. The reaction data and product conversion are tabulated in the TABLE.

EXAMPLE IV

The drag reducing efficiency of the polymer compositions prepared in Examples I to III is determined by comparing the pressure drop which occurs when a sample of hexane containing a test drag reducing agent (DRA) is pumped through a test loop with the pressure drop which occurs when the hexane containing no DRA is pumped through the test loop. The polymer compositions (in kerosene) are added to the hexane at a loading of 2 parts per million (ppm). The percentage pressure drop loss (percentage drag reduction) for each test run is calculated from the following formula:

$$\% \text{ Drag Reduction} = \frac{\Delta Pco - \Delta Ps}{\Delta Pco} \times 100$$

wherein $\Delta Pco$ is the measured drop which occurs when the hexane without drag reducing agent is pumped through the test loop and $\Delta Ps$ is the measured pressure drop which occurs when a DRA-containing hexane sample is pumped through the test loop.

TABLE

| Run | Temp., °C. | Composition | Conversion, % | Batch Time, Hrs. | Drag Reduction, % |
|---|---|---|---|---|---|
| 1 | 10 | $C_4/C_{12}$ Copolymer | 19.0 | 3.5 | 14.8 |
| 2 | 0 | $C_4/C_{12}$ Copolymer | 43.4 | 10 | 22.5 |
| 3 | −15 | $C_4/C_{12}$ Copolymer | 27.4 | 38 | 32.5 |
| 4 | 21 | $C_{12}$ Homopolymer | 10.8 | 2.5 | 8.9 |
| 5 | 0 | $C_{12}$ Homopolymer | 43.8 | 8 | 14.2 |
| 6 | −12 | $C_{12}$ Homopolymer | 10.2 | 32 | 11.4 |
| 7 | −15 | $C_6/C_{12}$ Copolymer | 6.7 | 6.5 | 25.5 |

The above examples show that the friction-reducing efficiency of butene-1-dodecene-1 copolymer can be significantly increased during its preparation by maintaining the reaction temperature at about 0° C. or lower during at least the early stage of the polymerization. It is surprising that the friction reducing efficiency of dodecene-1 homopolymer is not significantly increased by the improved process of the invention. The TABLE also shows that hexene-1-dodecene-1 copolymer prepared at low temperature has excellent drag reduction capability.

Although the invention is described by certain examples, it is not limited to the specific details of these examples. Other embodiments which are within the spirit of the invention are included. For example, the polymeric drag reduction agent may be prepared from more than two olefinic monomers and the agents of the invention may be used to reduce drag in hydrocarbon liquids other than crude oil. The scope of the invention is limited only by the breath of the appended claims.

What is claimed is:

1. In a process of preparing an alpha-monoolefin copolymer having superior hydrocarbon fluid friction-reducing properties by copolymerizing two or more alpha-monoolefins having 3 to 20 carbon atoms in the liquid state by means of a catalyst system comprising a first component which is a metal or metal compound of Groups IV-B, V-B or VIII of the Periodic Chart and an organo metal of a rare earth or metal from Groups I-A, II-A, or III-A of the Periodic Chart, the improvement comprising maintaining the temperature of the polymerization reaction mixture at a temperature of about 0° C. or lower until at least 15% by weight of the monomeric material present in the reaction mixture has been converted to polymer.

2. The process of claim 1 wherein at least part of the polymerization is carried out in the presence of an inert liquid which is a solvent for the polymeric product.

3. The improved method of claim 2 wherein the monomers being copolymerized are selected from alpha monoolefins having 4 to 16 carbon atoms and each monomer component is present in the reaction mixture at a concentration of at least 10 mole percent, based on the total moles of monomeric material in the reaction mixture.

4. The improved process of claim 3 wherein the polymerization temperature is maintained at about −5° C. or lower until at least 15% by weight of the monomeric material present in the reaction mixture is converted to polymer.

5. The improved method of claim 4 wherein the polymerization temperature is maintained at about −10° C. or lower until about 15 to 50% by weight of the monomeric material is converted to polymer.

6. The improved process of claim 5 wherein the alpha-monoolefins being copolymerized are butene-1 and dodecene-1.

7. The improved process of any one of claims 2 to 6 wherein the inert liquid is a hydrocarbon solvent selected from the group consisting of naphtha, kerosene, alkanes having 6 to 10 carbon atoms and mixtures of these.

* * * * *